July 30, 1968  F. R. KINNAN  3,394,554
CABLE-LAYING APPARATUS
Filed Aug. 8, 1966  3 Sheets-Sheet 2
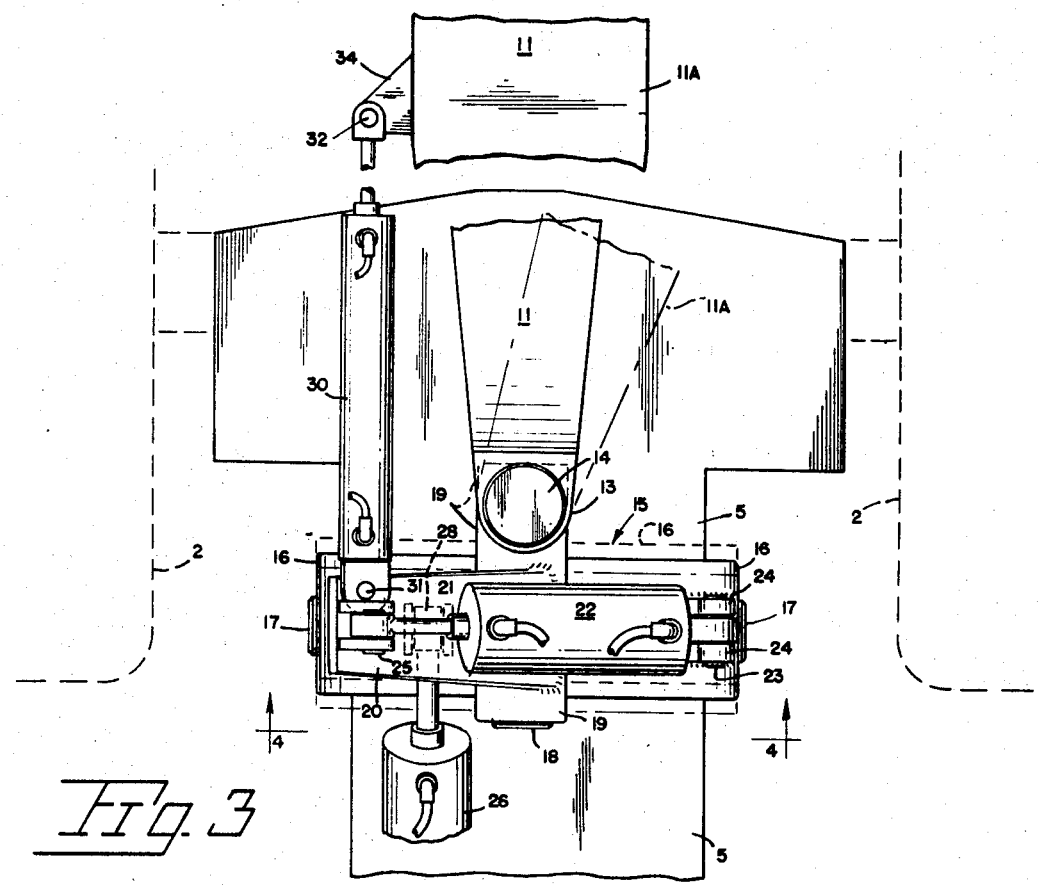
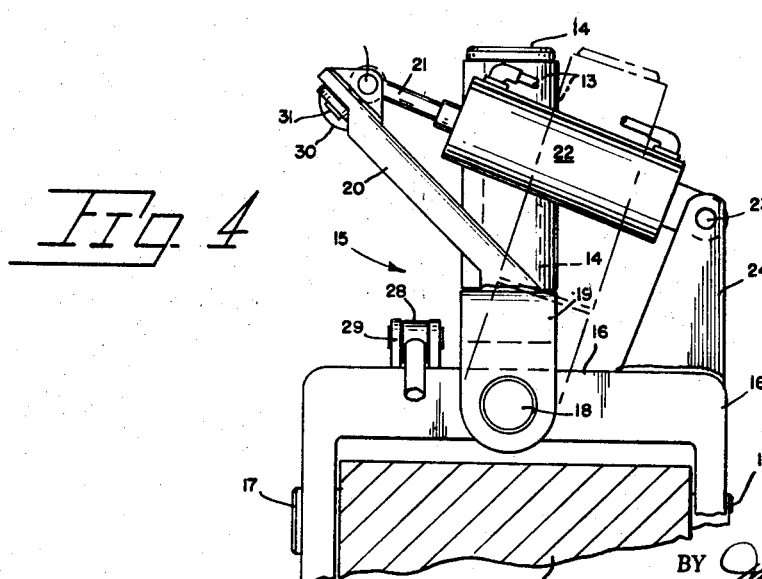
FRANK R. KINNAN
INVENTOR.
BY
AGENT July 30, 1968

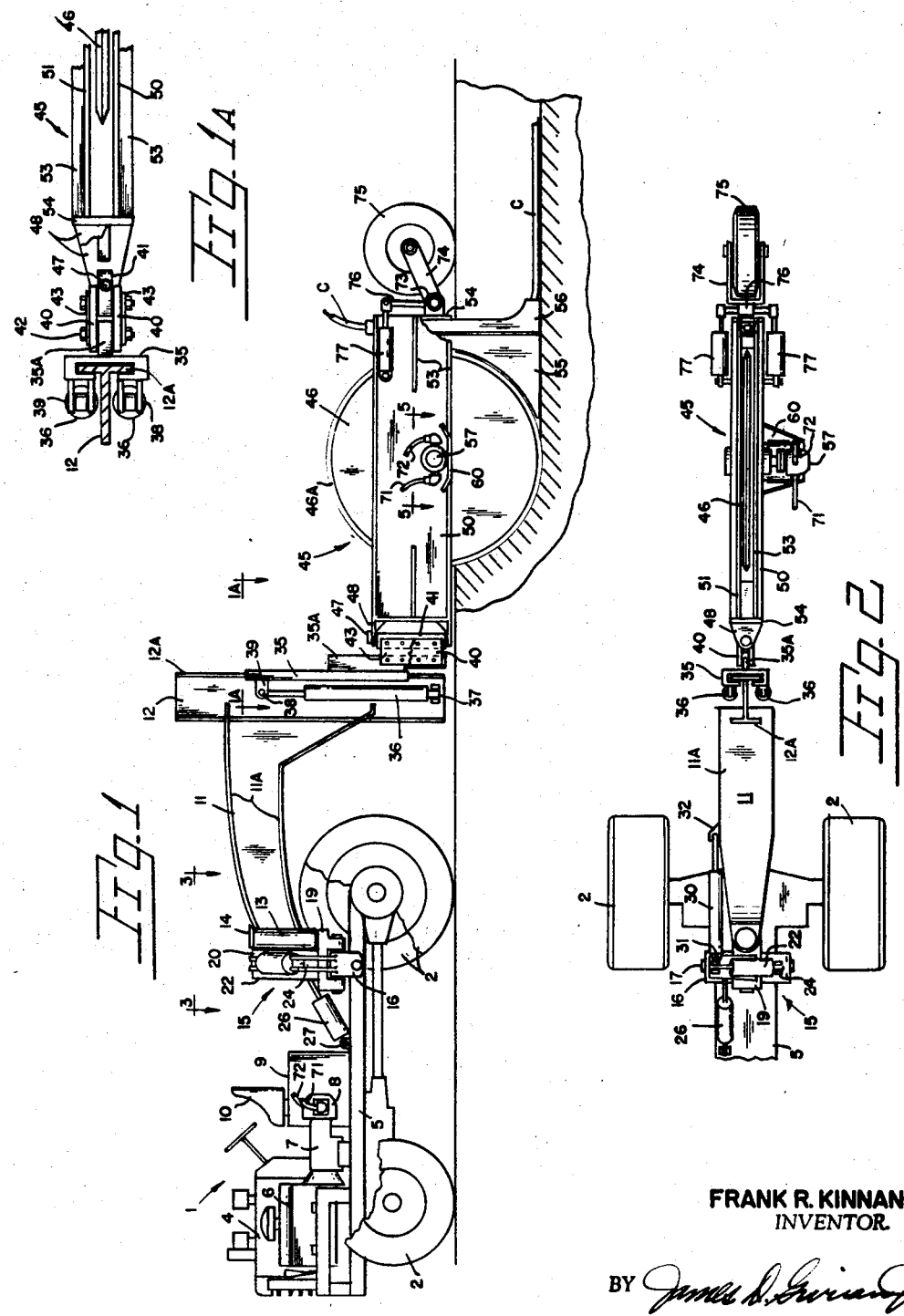
FRANK R. KINNAN
INVENTOR.

F. R. KINNAN 3,394,554

CABLE-LAYING APPARATUS

Filed Aug. 8, 1966

FRANK R. KINNAN
*INVENTOR.*

BY *[signature]*
AGENT

United States Patent Office 3,394,554
Patented July 30, 1968

3,394,554
CABLE-LAYING APPARATUS
Frank R. Kinnan, Camas Valley, Oreg., assignor to Henkels and McCoy, Inc., Blue Bell, Pa., a corporation of Pennsylvania
Filed Aug. 8, 1966, Ser. No. 570,890
10 Claims. (Cl. 61—72.6)

ABSTRACT OF THE DISCLOSURE

A cable or conduit laying apparatus wherein a rotatable cutting wheel is mounted on an assembly having a depending cable guide. A vibrator is provided on the assembly to vibrate the wheel as it advances through the earth to cut a kerf for the guide and the cable which follow. The assembly is pivotally attached by a beam to the chassis of a vehicle for laying the cable or conduit at various depths and angles to the ground surface.

---

Figure 5:
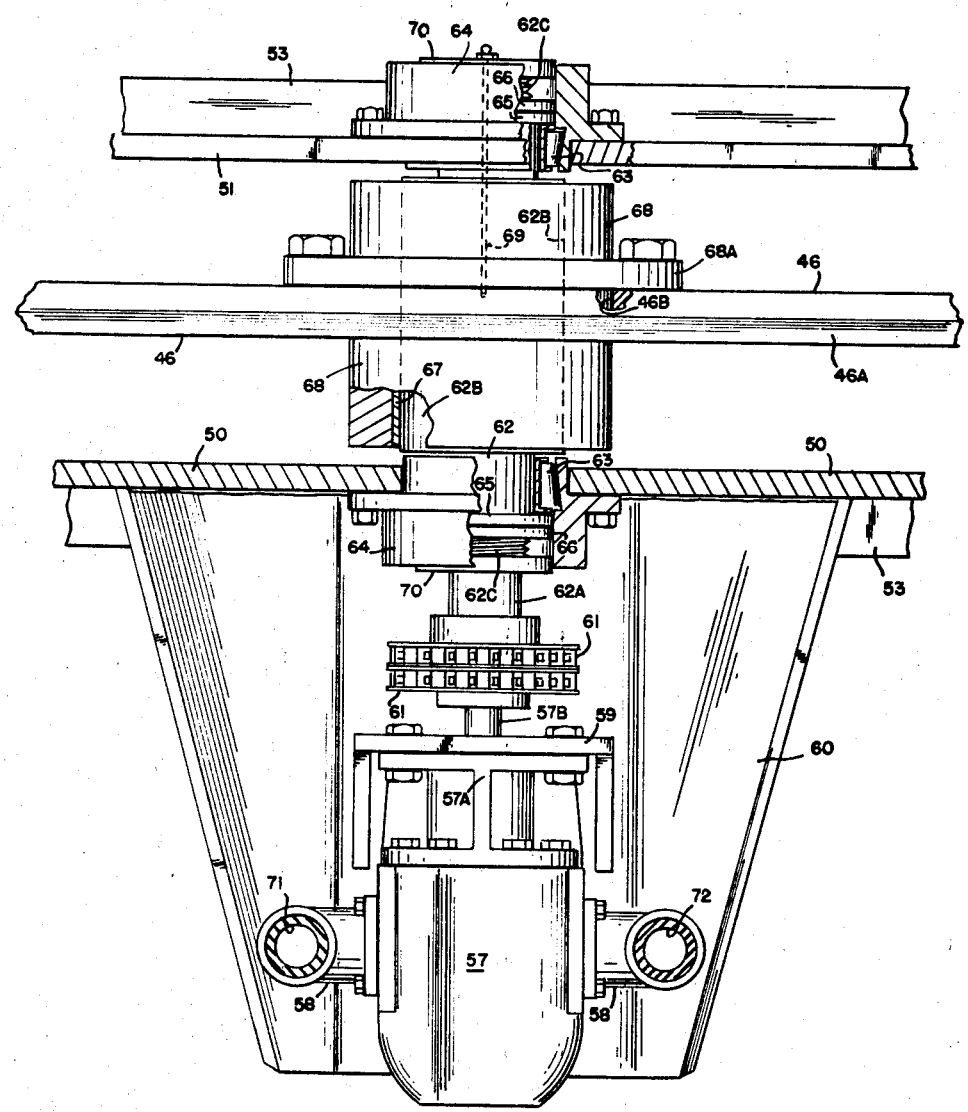

This invention relates generally to apparatus for the formation of a kerf within the surface of the ground and more particularly to such apparatus utilizing a cutting instrument in the form of a wheel in combination with cable or conduit laying devices.

One of the important objects of the present invention is the provision of kerf forming means of novel construction utilizing a vibratory instrument to permit the use of a prime mover requiring less tractive power than conventional cable laying plows. For the most part kerf forming instruments commonly referred to as cable plows are drawn by cleated or track type tractors, which, because of the damaging effects to paved surfaces, their use thereon has been often prohibited by state or county legislation. The present invention permits cable receiving kerfs to be formed to depths of several feet beneath paved surfaces with motive power being provided by a rubber tired vehicle thus providing an apparatus capable of laying cable or conduit both on and off paved roadways.

A further object of the present invention is the provision of a kerf forming instrument particularly adapted for use along paved roadways wherein the vibratory characteristic of the instrument provides a well defined lineal opening therein with minimum ground disturbance and soil displacement to the roadway and one wherein the narrow opening is conveniently closed by repaving. The conventional steps in laying cable or conduit under paved roadways include separate, time-consuming steps of making parallel cuts defining the kerf to be dug by a ditching machine and subsequently after laying the cable the steps of back filling and repaving. The use of a beveled cutting wheel in the present invention results in a downward and outward compacting force to be exerted against the ground to form the kerf in distinction to conventional cable plow assemblies which utilize substatially upright blade elements, the latter producing horizontal displacement and a degree of undesirable soil heaving.

Another important object of the present apparatus is the provision of a wheel or disc cutting element attached to a mobile unit in a manner permitting powered positioning of the novel element about a plurality of axes to permit laying of cable or conduit at various depths and angles to the ground surface. Additionally, the manner in which the cutting element is attached to the prime mover provides a highly mobile unit capable of conveniently moving from one cable-laying site to another.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of the cable laying apparatus.
FIGURE 1A is a sectional, plan view taken approximately along line 1A—1A of FIGURE 1.
FIGURE 2 is a plan view of FIGURE 1 with a portion of the tractor removed.
FIGURE 3 is a fragmentary plan view taken approximately along line 3—3 of FIGURE 1 and showing the universal attachment means.
FIGURE 4 is an elevational view taken along line 4—4 of FIGURE 3.
FIGURE 5 is a plan view of the means for imparting vibratory motion to the cutting wheel shown with associated fragments of said wheel and supporting carrier assembly.

With continuing reference to the drawings wherein like reference numerals indicate like parts and particularly FIGURES 1 and 2 thereof, the reference numeral 1 indicates generally a tractor type vehicle having front and rear ground engaging wheels 2 of which preferably all four are in driving connection in a conventional manner with an engine 4 located at the forward end of a chassis 5. Also mounted at the forward end of the chassis 5 in a manner laterally offset from engine 4 is a second engine 6 of lesser size and power for driving the vibratory means associated with the cutting wheel as hereinafter more fully described. Driven by engine 6 through a variable speed transmission unit 7 is a hydraulic pump 8 of the gear type. A reservoir 9 containing a quantity of hydraulic fluid is in fluid circuit with one side of the pump 8.

An operator's station 10 is provided with conventional controls for tractor operation and additionally a bank of three-position valves, later described in detail, for control of the hydraulic operated cylinder components hereinafter referred to.

An attachment beam 11 extends rearwardly in a trailing manner from the tractor 1 and terminates in an upright portion 12 of I-beam section having flanges indicated at 12A. The forward end of attachment beam 11 terminates in a collar 13 journalled about an upright pintle 14, the latter comprising part of universal pivot means indicated generally at 15 for beam 11. Similar to its upright portion 12 the attachment beam 11 is provided with flanges 11A for purposes of rigidity.

The universal pivot means 15, as best shown in FIGURES 3 and 4, comprises a yoke 16 pivotally mounted transversely of the chassis 5 by pins 17 for movement about a horizontal, transverse axis. For purposes of explanation, all axes are described relative to the longitudinal axis of tractor 1. Hingedly attached as at 18 by pivot pins in crosswise relationship to the yoke 16 is a plate 19 tiltable about the axis of pins 18, the latter normally parallel to the longitudinal axis of the tractor. Secured to the rearward end of plate 19 is the pintle 14. A bracket 20 of inverted channel shape is also secured, as by welding, to plate 19 and extends upwardly therefrom in an inclined manner to provide an arm for the attachment at 25 of a piston rod 21 of a first hydraulic cylinder 22, the cylinder end of which is swingably mounted as at 23 within a pair of upright mounting brackets 24 carried by the yoke 16. Accordingly, it will be seen that extension or retraction of rod 21 will cause plate 19, pintle 14 carried thereby and hence the attachment beam 11 to tilt about the longitudinal axis of the pins 18 which as aforesaid is normally parallel to the axis of travel of the tractor.

The yoke 16 is similarly positioned about a transverse horizontal axis (relative to longitudinal axis of tractor) by a fore and aft mounted hydraulic cylinder 26 attached at its cylinder end at 27 (FIGURE 1) to the chassis 5 with its rod end 28 pivotally attached to clevis plates 29 secured to yoke 16. Accordingly, yoke 16 may be tilted fore and aft about pins 17 to position the plate 19, pintle 14 and attachment beam 11 within a vertical or depending on the extension of rod 21 within a slightly inclined plane.

A third hydraulic cylinder indicated at 30 of the universal pivot means is provided for positioning of attachment beam 11 within a substantially horizontal plane about the upright axis of pintle 14. Cylinder 30 is pinned at 31 to the bracket 20 and oppositely its rod end is pivotally attached at 32 to a plate 34 affixed at a point along the attachment beam 11.

In view of the foregoing it will be apparent that the attachment beam 11 and particularly the upright portion thereof indicated at 12 (as viewed in FIGURE 1) is positionable in a universal manner about the axes of pins 17 and 18 and the pintle 14.

The rearward flange of the pair of flanges 12A of upright beam 12 carries a slide member 35 which is positionable by a pair of upright hydraulic cylinders 36, the latter being attached at their cylinder ends at 37 to the lower opposite sides of beam 12 as best shown in FIGURE 1. The rod ends of cylinders 36 are attached by pins 38 and clevis plates 39 to the upper end of slide member 35. With reference to FIGURE 1A, slide member 35 is formed to overlie the inner as well as the outer surfaces of the rearmost flange 12A, the latter constituting a trackway for vertical movement of the slide member by cylinder 36.

With continuing reference to FIGURE 1A and FIGURE 1, a rearward extension 35A is provided integral with the slide member 35 to thereat provide a forward mounting base for a pair of resilient pad members 40, a rearward mounting base being provided therefor in the form of a swingably mounted, elongated member 41 carried intermediate brackets 48 affixed to the leading end and providing the attachment point for a wheel carrier assembly indicated generally at 45. A pin 47 provides a pivotal connection of the assembly to the member 41. The resilient members 40 are secured by parallel rows of fasteners 42 extending through clamping plates 43 with the fasteners of the forward row extending through apertures in extension 35A and fasteners of the rear row extending through member 41 thus providing means for insulating the tractor 1 and attachment beam 11 from vibratory motion of a ground engaging cutting wheel indicated at 46.

The main frame of the wheel carrier 45 comprises a pair of horizontally spaced, rectangular plates 50 and 51. Each plate 50-51 is reinforced against distortion by a plurality of stiffeners as at 53 extending lengthwise of the plates 50-51 and being coterminous with front and rear end plates 54. Carried intermediate plates 50-51 in an aligned manner are the cutting wheels 46, a blade 55 and a cable shoe or guide 56 for the cable or conduit C.

A hydraulic motor of conventional design is indicated at 57 operatively coupled with the cutting wheel 46 to impart vibratory motion thereto, as hereinafter more fully described, to facilitate ground penetration of the wheel's beveled, circumferential cutting edge 46A. With reference to the plan view of FIGURE 5, the motor includes a mounting pad 57A which in turn is bolted to a motor mount 59 secured to a supporting plate 60, the latter welded to plate 50 of the carrier. The plate 60 also provides a ground guard for both the motor and a flexible drive coupling indicated at 61 also of conventional design.

A motor output shaft 57B terminates in splined engagement with one side of the coupling 61 in axial alignment with one end 62A of a wheel supporting axle 62, said end being in operative engagement with the driven side of the coupling. Fittings 58 receive the ends of delivery and return conduits 71-72. While a hydraulic motor is shown and described it will be obvious that other satisfactory drive means may be substituted therefor. The axle 62 is journaled at its ends within a pair of tapered roller bearings 63, each of the bearings being retained within identical housings indicated at 64 carried by plates 50-51.

The center section 62B or hub carrying portion of axle 62 is enlarged and machined on a center offset slightly from the common axis of the journalled ends 62 thereof to effect an oscillatory motion in wheel 46 upon driven axle rotation. Further, axle 62 is threaded inwardly a distance as at 62C to thereat receive jam and lock nuts 65 and 66 securing the bearings 63. By way of example only, it has been found practical to machine the center section 62B on a 2.5 inch radius offset one-eighth inch from the aforesaid common axis of the ends of the axle.

A wear resistant bushing 67 is fitted within and extends the length of a freely rotatable hub indicated at 68, the latter having a flange 68A in bolted engagement within a central aperture 46B of wheel 46. A lubrication passageway 69 is drilled axially in shaft 62 and provided with a suitable pressure type fitting. Dust seals 70 close the ends of housings 64.

Hydraulic motor 57 is in fluid circuit by means of delivery and return conduits 71-72 with the hydraulic pump 8 driven by engine 6 through variable speed transmission 7. A by-pass valve (not shown) is provided to permit selective diversion by the operator of pressurized fluid from the delivery conduit 71 to the reservoir 9 to temporarily stop as desired the vibratory motion of the cutting wheel.

With attention to FIGURE 1, hingedly mounted at 73 upon the rear plate 54 of the wheel carrier assembly 45 is a fork 74 carrying a ground compaction wheel 75. The fork 74 is integral with an upright arm 76 both of which being positionable in a bell crank manner by a pair of hydraulic cylinders 77 swingably mounted at their cylinder ends to the plates 50-51 of the wheel carrier. Accordingly, wheel 75 may be swung into ground bearing contact throughout the various heights of the wheel carrier assembly above the ground. The compaction wheel 75 obviates a separate compaction vehicle used with conventional cable laying equipment in off-pavement cable laying operations.

The hydraulic cylinders 22, 26 and 30 associated with the universal pivot means 15 as well as pairs of upright cylinders 36 and wheel positioning cylinders 77 are controlled through pressurized fluid from the pump 8 selectively directed to the extension or retraction side of said cylinders through conventional operator controlled three-position valves having a hold position wherein the valve's ports are blocked to hydraulically lock in position the piston within the cylinder(s) controlled by the valve. It will be understood that the pairs of hydraulic cylinders 36 and 77 act in unison and hence a single control valve may be provided for each pair by reason of the extension and retraction conduits being branched for communication with the respective sides of the cylinders.

In operation with the apparatus at a work site commencing the start of a course along which cable or conduit C is to be laid below the ground surface upon forward movement of tractor 1 the retraction chambers of cylinders 36 are pressurized causing the piston rods to exert a downward force on slide member 35 and simultaneously the wheel carrier assembly 45. Aided by the weight of the carrier assembly the beveled edge 46A of freely rotatable wheel 46 gradually penetrates downwardly through the ground along with blade 55 and cable guide 56 with the axis of wheel 46 moving along a forward downwardly inclined vector. Upon reaching the depth specified for the particular cable laying operation the control valve in circuit with cylinders 36 is moved to the hold position securing the cylinders' piston rods against movement. The end of cable or conduit C is then drawn through the guide 56 and secured.

In a typical operation along a road shoulder it is necessary periodically to position the wheel carrier assembly 45 at a transversely inclined angle relative to the ground surface in order that the material may be laid under and inwardly from the end of a culvert. Accordingly, selective pressurization of either the extension or retraction chambers of cylinder 22 of the universal attachment means 15 will urge, in a gradual manner, the transverse tilting of upright beam 12 and consequently the wheel carrier assembly 45 during advancement of the apparatus. Such positioning obviously, by reason of the ground penetrating components is accomplished simultaneously during forward advancement of the apparatus over a distance of several yards.

Upright beam 12 is positionable in a horizontal plane about the axis of pintle 14 by extension or retraction of cylinder 30, for example, when it is desired to lay cable or conduit along a road shoulder while maintaining the tractor on the paved portion of the roadway. The pivotal connection at pin 47 permits the assembly 45 to trail. Cylinder 26 associated with the universal pivot means 15 is selectively pressurized for raising and lowering the attachment beam 11 and wheel carrier assembly 45 as a unit for temporary variations in the depth of penetration of wheel 46.

The vibratory motion imparted to wheel 46 by motor 57 tends to fluidize ground particles to reduce the requisite force for their compaction by the advancing beveled edge 46A of the wheel.

In off-pavement operation of the apparatus the compaction wheel 75 is biased downwardly by cylinders 77 into rolling bearing with the marginal edges defining the kerf opening. The limited degree of soil heaving (vertical displacement) is accordingly remedied by the single wheel bridging the kerf.

While I have shown one form of my invention it will be apparent that minor modifications will readily suggest themselves to others skilled in the art without departing from the spirit and scope of the invention.

I claim:

1. Apparatus for forming a kerf within the ground and laying continuous lineal material therein, said apparatus comprising,
    a vehicle including a chassis,
    a wheel carrier assembly including a freely rotatable cutting wheel carried thereby and adapted for rolling penetration of the ground to form a kerf therein,
    an attachment beam interconnecting said carrier assembly to the vehicle chassis and including pivot means attaching said beam to said chassis permitting movement of said beam and said carrier assembly relative to said chassis,
    a cable guide carried by said carrier for downward passage of the lineal material therethrough into the kerf, and
    vibratory means mounted upon said carrier and operatively engaged with said wheel to impart vibratory motion thereto whereby the particles of ground immediately forward of the advancing periphery of said cutting wheel will be agitated to a fluid state to thereby lessen their resistance to the advancement of the wheel.

2. The apparatus claimed in claim 1 wherein said pivot means attaching said beam and said carrier assembly to said chassis includes a yoke pivotally mounted upon said chassis permitting fore and aft movement of said beam about a transverse horizontal axis, a plate pivotally mounted to said yoke permitting tilting movement of said beam about a longitudinal horizontal axis and an upright pintle carried by said plate permitting movement of said beam within a normally horizontal plane.

3. The apparatus as claimed in claim 2 wherein said pivot means further includes a first hydraulic cylinder coupled to said chassis and said yoke, a second hydraulic cylinder coupled to said yoke and said plate, said first and second hydraulic cylinders adapted for powered movement respectively of said attachment beam and said carrier assembly about said transverse horizontal axis and said longitudinal horizontal axis.

4. The apparatus as claimed in claim 3 wherein said pivot means further includes a third hydraulic cylinder coupled to said attachment beam and said plate for powered movement of said beam and said assembly within a normally horizontal plane.

5. The apparatus as claimed in claim 1 wherein said attachment beam includes an elongated upright portion, a slide member carried by said portion and adapted for vertical travel therealong, hydraulic means carried by said upright portion and operatively connected to said slide member to vertically position the latter, and wherein said wheel carrier assembly includes resilient members interconnecting said carrier and said slide member to insulate said slide member and attachment beam from vibratory motion of the wheel carrier assembly.

6. The apparatus as claimed in claim 1 wherein said cutting wheel includes a hub, and wherein said vibratory means comprises a motor having an output shaft, an axle having a radially offset portion disposed within said hub, drive means coupled with said axle for rotation thereof and particularly to said offset portion to impart vibratory motion to said wheel.

7. The apparatus as claimed in claim 6 wherein said motor is hydraulically driven and said vehicle includes means for pressurizing a hydraulic circuit including said motor.

8. In combination with a tractor type vehicle having an attachment beam pivotally mounted to said vehicle for powered movement about a plurality of axes, a wheel carrier assembly for the laying of lineal material within a kerf comprising in combination;
    an elongated frame attached at one of its ends to said attachment beam for movement therewith,
    a cable guide carried by said frame and adapted for ground penetration,
    a cutting wheel including a hub supported by said frame and adapted for rolling penetration of the ground surface along a horizontal path,
    axle means associated with said wheel journalled within said frame and having a radially offset portion disposed within said hub, and
    drive means coupled with said axle means for rotation thereof and particularly said offset portion to impart vibratory motion to said wheel whereby the ground particles in the immediate forward path of said wheel will be agitated to a fluid state to facilitate the passage of the wheel and said cable guide therethrough.

9. The invention claimed in claim 8 wherein said elongated frame includes resilient means carried at said one of its ends and thereat attaching said frame to said beam in a manner insulating the latter from the vibratory motion of the wheel and frame.

10. The invention as claimed in claim 8 wherein said elongated frame is provided at its opposite end with ground compaction means including a compaction wheel adapted for biased contact with the kerf edges.

References Cited

UNITED STATES PATENTS

| 2,641,173 | 6/1953 | Rhoten. | |
| 3,211,236 | 10/1965 | Patton. | |
| 3,222,876 | 12/1965 | Harmstorf | 61—72.4 |
| 3,307,363 | 3/1967 | Kinnan | 61—72.6 |
| 3,326,009 | 6/1967 | Gagne | 61—72.6 |
| 3,326,010 | 6/1967 | Gagne | 61—72.6 |

EARL J. WITMER, *Primary Examiner.*